United States Patent [19]
Mancy et al.

[11] 3,857,937
[45] Dec. 31, 1974

[54] ANTIBIOTICS 23,671 RP AND 23,672 RP
[75] Inventors: Denise Mancy, Charenton; Jean Florent; Jean Lunel, both of Paris, all of France
[73] Assignee: Rhone-Poulenc S.A., Paris, France
[22] Filed: Feb. 23, 1972
[21] Appl. No.: 228,621

[30] Foreign Application Priority Data
Feb. 25, 1971 France .............................. 71.06492

[52] U.S. Cl. .................................. 424/120, 195/80
[51] Int. Cl. ........................................... A61k 21/00
[58] Field of Search ....................... 424/120; 195/80

[56] References Cited
UNITED STATES PATENTS
3,642,985   2/1972   Katagiri .............................. 424/120

Primary Examiner—Jerome D. Goldberg

[57] ABSTRACT

New antibiotics 23,671 RP and 23,672 RP are prepared by cultivating the hitherto unknown microorganism *Streptomyces chryseus* DS 12,370 (NRRL 3892) under aerobic conditions in an aqueous nutrient medium. The antibiotics are useful, in particular, against staphylococcal infections and tubercular affections.

11 Claims, 4 Drawing Figures

3,857,937

ANTIBIOTICS 23,671 RP AND 23,672 RP

This invention relates to two new antibiotics, hereinafter designated by the numbers 23,671 RP and 23,672 RP, to a process for their preparation and pharmaceutical compositions containing them.

Antibiotics 23,671 RP and 23,672 RP possess a high antimicrobial activity, principally against Gram positive microorganisms in particular against staphylococci, as well as against mycobacteria, in particular against the H 37 Rv strain of the tuberculosis bacillus. Furthermore, they have the advantage of having a low mammalian toxicity.

The aforesaid antibiotics are produced by culture in artificial culture media of a microorganism, identified more completely hereinafter, belonging to the genus Streptomyces and designated by the name Streptomyces chryseus, DS 12,370 (NRRL 3892). A specimen of this strain has been deposited with the U.S. Department of Agriculture, Northern Regional Research Laboratory, at Peoria, Illinois, U.S.A., and has been given the number NRRL 3892; a sample of the microorganism can be obtained from the aforementioned Research Laboratory.

PHYSICO-CHEMICAL PROPERTIES OF THE ANTIBIOTICS

Antibiotic 23,671 RP is characterised by the following physico-chemical properties:

Appearance: white crystalline powder

Elementary analysis: it consists of carbon, hydrogen and oxygen in the following proportions: C = 58.45–58.6%, H = 8.6–8.7%, O = 31.35–31.55%

Solubility: it is practically insoluble in water at 20°C; it is soluble in alcohols, acetone, diethyl ether, dimethylformamide and chlorinated hydrocarbon solvents.

Melting point (Kofler bench): 130°–132°C.

Optical rotation: $[\alpha]_D^{24.5} = -71.5° \pm 1.5°$ ($c = 1$, methanol)

Ultra-Violet spectrum: in methanol solution, it has an absorption maximum at 285 nm ($E_{1\,cm}^{1\%} = 1.04$) and an absorption minimum at 252 nm ($E_{1\,cm}^{1\%} = 0.67$).

Figure 1:
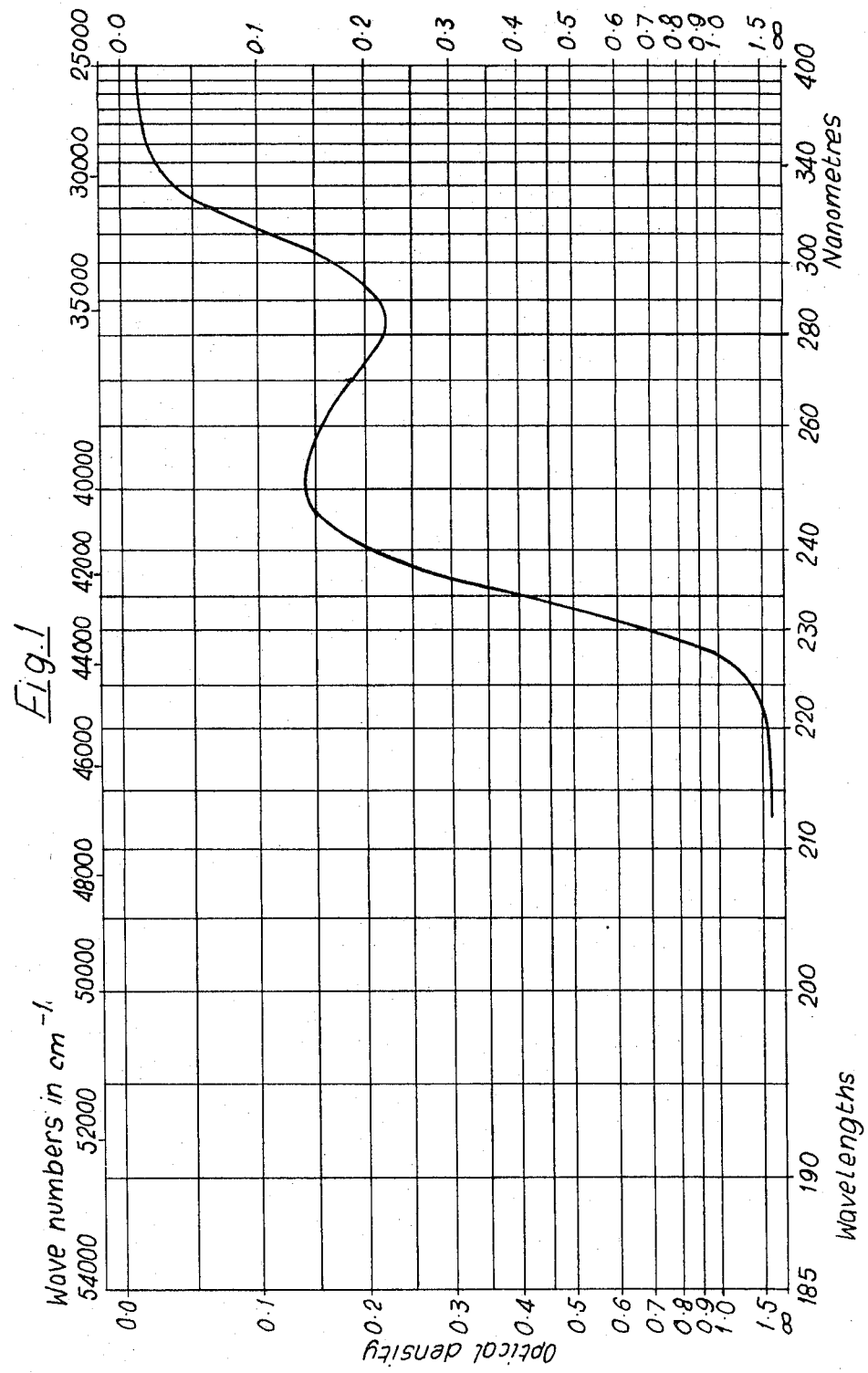

The ultra-violet spectrum of 23,671 RP dissolved in methanol at a concentration of 2,110 μg/cc. is shown in FIG. 1 of the accompanying drawings in which the abscissae give the wavelengths expressed in nanometres (lower scale) and the wave numbers in cm⁻¹ (upper scale) and the ordinate gives the optical densities.

Infra-red spectrum: (determined with tablets of a mixture with KBr).

Figure 2:
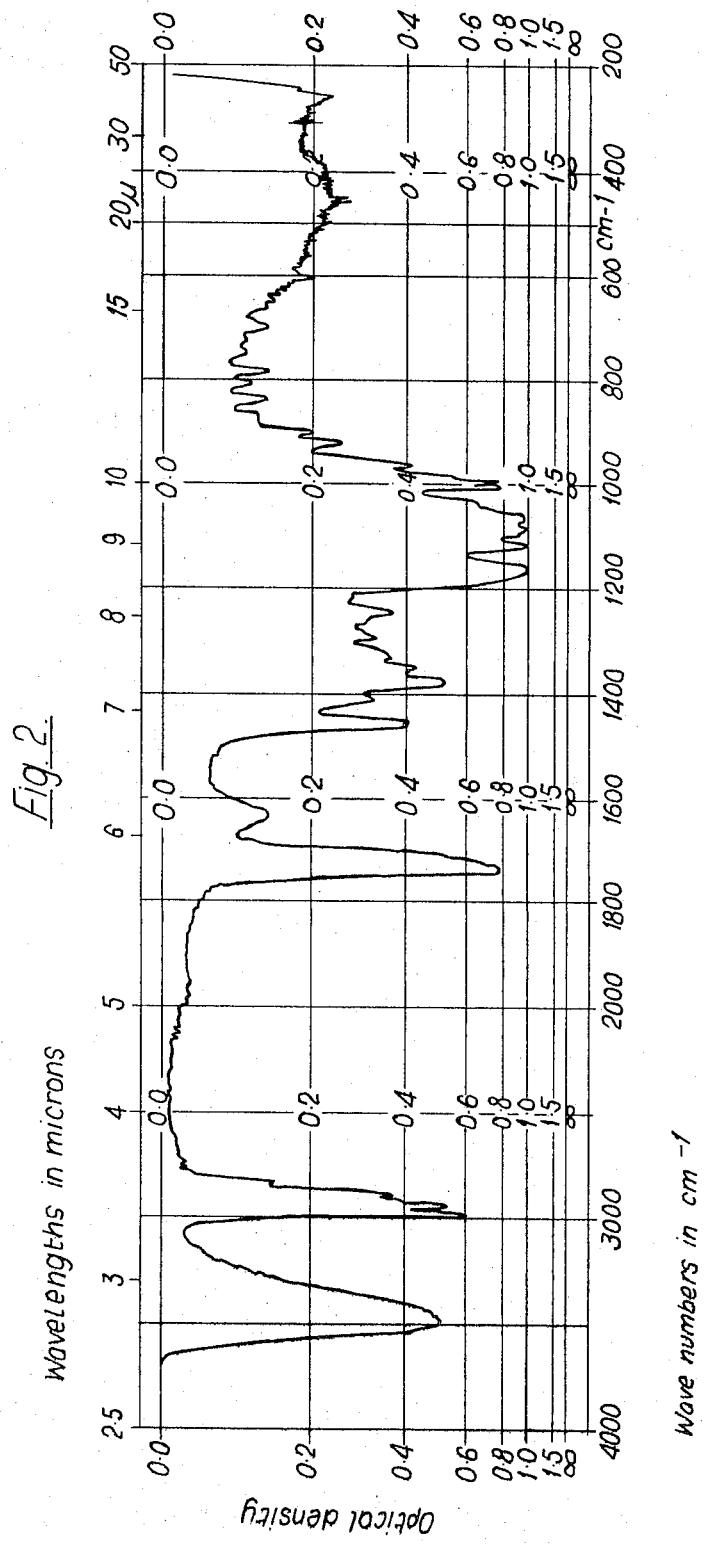

This spectrum is shown in FIG. 2 in which the abscissae give the wavelengths expressed in microns (upper scale) and the wave numbers in cm⁻¹ (lower scale), and the ordinate gives the optical densities.

The principal infra-red absorption bands of 23,671 RP, expressed as wave numbers (cm⁻¹), are given in Table 1 which follows.

Table I

| | | | |
|---|---|---|---|
| 3,480 S | 1,325 sh | 905 m | |
| 2,980 S | 1,295 m | 870 w | |
| 2,940 S | 1,260 sh | 835 m | |
| 2,920 sh | 1,235 m | 805 w | |
| 2,890 m | 1,215 vw | 780 m | vS = very strong |
| 2,840 w | 1,162 vS | 745 vw | S = strong |

Table I-Continued

| | | | |
|---|---|---|---|
| 1,735 vS | 1,115 S | 725 vw | m = medium |
| 1,710 sh | 1,095 sh | 700 w | w = weak |
| 1,630 m | 1,080 vS | 660 sh | vw = very weak |
| 1,455 S | 1,060 S | 645 sh | sh = shoulder |
| 1,412 m | 1,035 sh | 600 w | |
| 1,375 S | 1,000 S | 500 w | |
| 1,350 m | 985 sh | 455 m | |
| 1,345 sh | 965 m | 420 w | |
| 1,330 m | 920 m | 395 w | |

Chromatographic Migrations

When chromatographed on a thin layer of a mixture of kieselgel H and alumina H (75-25%) under the following conditions:

deposition of 100 μg of antibiotic as the source development with pure ethyl acetate in a saturated cell at 22°C and revelation by spraying with concentrated sulphuric acid, 23,671 RP has an Rf of 0.26.

When chromatographed on a thin layer of Merck silica gel F 254 and developed with the system ethyl acetate-chloroform-acetone (1-1-1 by volume) and revealed under the above conditions, 23,671 RP has an Rf of 0.62.

Antibiotic 23,672 RP is characterised by the following physico-chemical properties:

Appearance: white crystalline powder.

Elementary analysis: it consists of carbon, hydrogen and oxygen in the following proportions: C = 58.6 – 58.7%, H = 8.4 – 8.5%, O = 32.6 – 32.8%

Solubility: it is practically insoluble in water at 20°C; it is soluble in alcohols, acetone, diethyl ether, dimethylformamide and chlorinated hydrocarbon solvents.

Melting point (Kofler bench): 153° – 155°C

Optical rotation: $[\alpha]_D^{24.5} = -71° \pm 1.5°$ ($c = 1$, methanol)

Ultra-violet spectrum: in methanol solution, it has an absorption maximum at 285 nm ($E_{1cm}^{1\%} = 0.67$) and an absorption minimum at 254 nm ($E_{1\,cm}^{1\%} = 0.40$).

Figure 3:
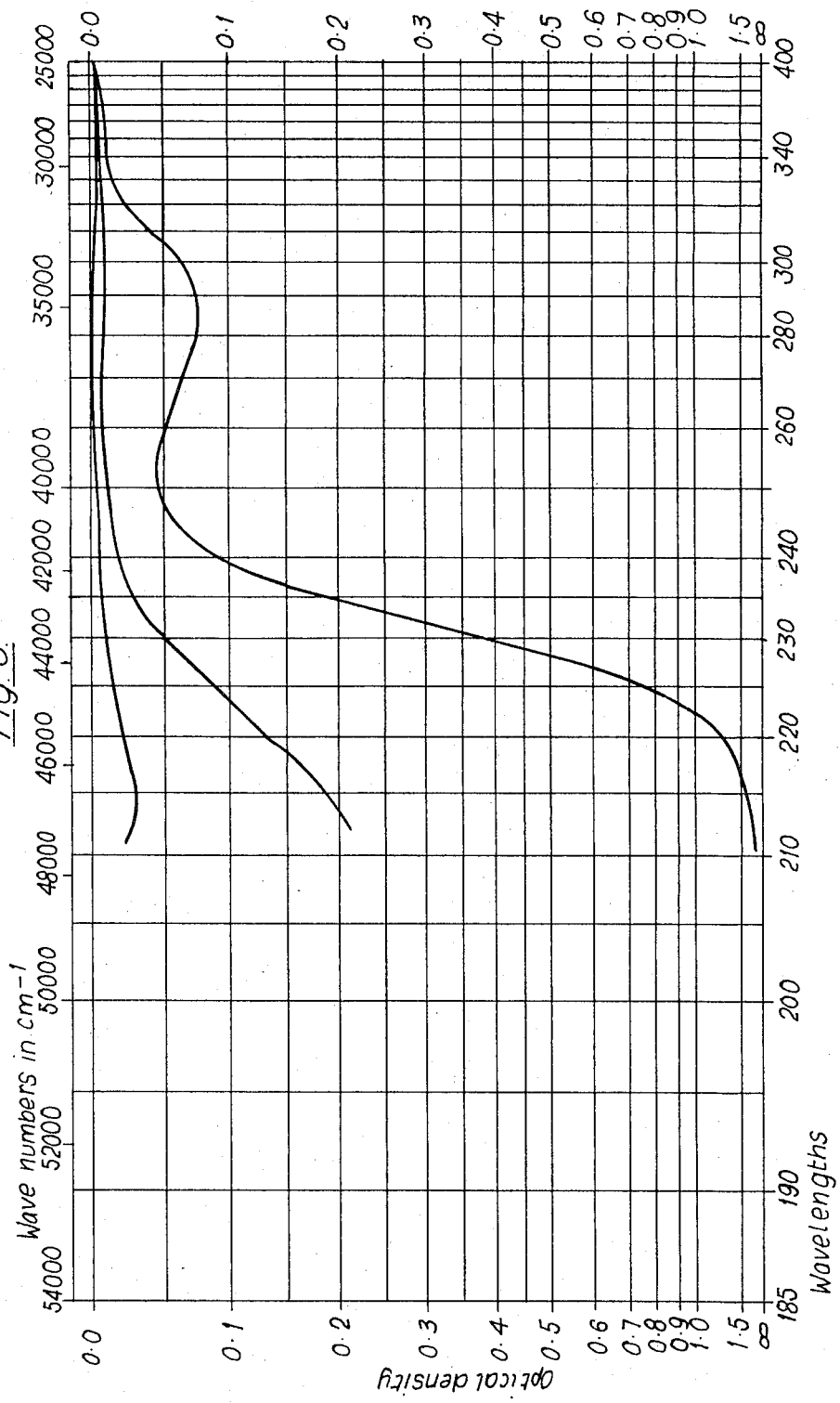

The ultra-violet spectrum of 23,672 RP dissolved in methanol at concentrations of 10.6, 106 and 1,155 μg/cc. is shown in FIG. 3 in which the abscissae give the wavelengths expressed in nanometres (lower scale) and the wave numbers in cm⁻¹ (upper scale) and the ordinate gives the optical densities.

Infra-red spectrum: (determined with tablets of a mixture with KBr).

Figure 4:
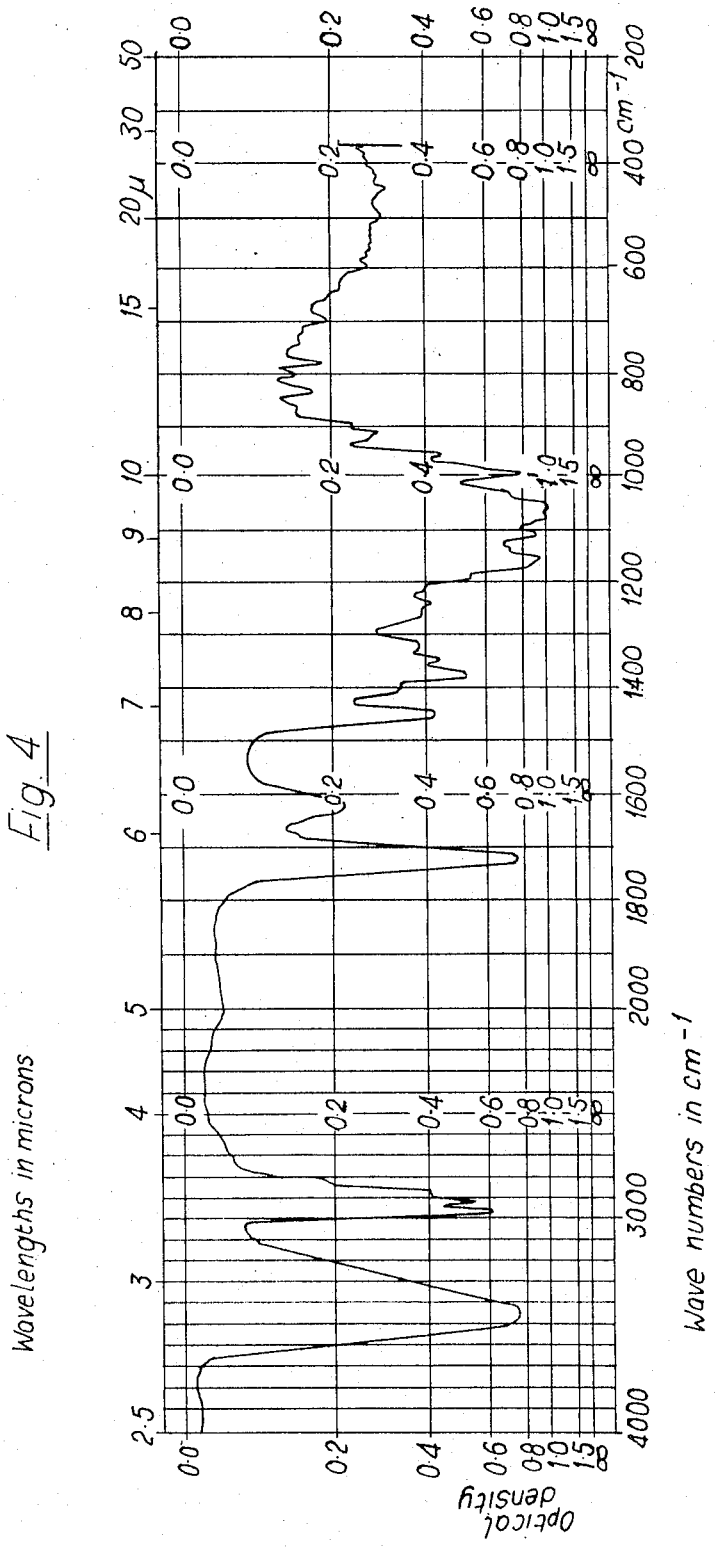

This spectrum is shown in FIG. 4 in which the abscissae give the wavelengths expressed in microns (upper scale) and the wave numbers in cm⁻¹ (lower scale) and the ordinate gives the optical densities.

The principal infra-red absorption bands of 23,672 RP, expressed as wave numbers (cm⁻¹), are given in Table II.

Table II

| | | | |
|---|---|---|---|
| 3,450 vS | 1,240 m | 895 w | |
| 3,210 sh | 1,210 w | 860 w | |
| 2,965 S | 1,185 sh | 830 m | |
| 2,921 S | 1,155 vS | 800 w | |
| 2,890 sh | 1,135 w | 777 m | |
| 2,870 w | 1,108 S | 740 vw | vS = very strong |
| 2,830 sh | 1,090 sh | 715 vw | S = strong |
| 2,040 vw | 1,075 m | 692 m | m = medium |
| 1,740 vS | 1,070 w | 655 sh | w = weak |
| 1,625 m | 1,055 vS | 635 sh | vw = very weak |

Table II-Continued

| | | | |
|---|---|---|---|
| 1,450 S | 1,025 sh | 595 m | sh = shoulder |
| 1,405 m | 995 S | 545 m | |
| 1,375 S | 975 sh | 490 m | |
| 1,347 m | 955 m | 450 m | |
| 1,325 m | 922 sh | 415 sh | |
| 1,255 w | 912 m | | |

Chromatographic Migrations

When chromatographed on a thin layer of a mixture of kieselgel H and alumina H (75 – 25%) under the same conditions as antibiotic 23,671 RP, with ethylacetate as the eluent, 23,672 RP has an Rf of 0.17.

When chromatographed on a thin layer of Merck silica gel F 254 and developed with ethyl acetate, 23,672 RP has a Rf of 0.38, and when developed with the system ethyl acetate-chloroform-acetone (1-1-1 by volume) it has an Rf of 0.50.

ANTIBIOTIC ACTIVITY AND TOXICITY

A. Bacteriostatic activity in vitro

The bacteriostatic activity of 23,671 RP and 23,672 RP against a certain number of microorganisms was determined by one of the dilution methods usually employed for this purpose. For each microorganism, the minimum concentration of antibiotic, which — under specified conditions — inhibits all visible development of the microorganism in an appropriate nutrient broth, was determined. The results of the various determinations are given in Table III below wherein the minimum bacteriostatic concentrations of the antibiotics are expressed in micrograms of antibiotic per cc. of test medium.

Table III

| Bacterial organisms tested | Minimum bacteriostatic concentrations $\mu g/cc.$ | |
|---|---|---|
| | 23,671 RP | 23,672 RP |
| Staphylococcus aureus, Smith strain | 0.70 | 0.67 |
| Staphylococcus aureus, strain 133 (Institut Pasteur) | 0.90 | 1.2 |
| Staphylococcus aureus, strain 209 P-ATCC 6,538 P | 0.38 | 0.54 |
| Staphylococcus aureus, strain 209 P-ATCC 6,538 P, rendered resistant to carbomycin | >200 | >200 |
| Staphylococcus aureus, strain 209 P-ATCC 6,538 P, rendered resistant to erythromycin | 110 | 170 |
| Staphylococcus aureus, strain 209 P-ATCC 6,538 P, rendered resistant to spiramycin | 0.56 | 0.86 |
| Staphylococcus aureus, strain 209 P-ATCC 6,538 P, rendered resistant to pyostacin | 48 | 55 |
| Sarcina lutea - ATCC 9,341 | 0.05 | 0.07 |
| Streptococcus faecalis - ATCC 9,790 | 1.7 | 1.5 |
| Streptococcus viridans (Institut Pasteur) | 8.3 | 6.7 |
| Streptococcus pyogenes haemolyticus (Dig 7 strain, Institut Pasteur) | 0.19 | 0.24 |
| Diplococcus pneumoniae (Til strain, Institut Pasteur) | 2.3 | 1.1 |
| Bacillus subtilis - ATCC 6,633 | 0.15 | 0.35 |
| Bacillus cereus - ATCC 6,630 | 0.05 | 0.10 |
| Mycobacterium species - ATCC 607 | 0.52 | 0.42 |
| Mycobacterium para-smegmatis (1 75-Lausanne) | 1.2 | 0.35 |
| Escherichia coli - ATCC 9,637 | >200 | >200 |
| Shigella dysenteriae Shiga L (Institut Pasteur) | >200 | >200 |
| Salmonella paratyphi A (Lacasse, Institut Pasteur) | >200 | >200 |
| Salmonella schottmuelleri (paratyphi B) Fougenc (Institut Pasteur) | >200 | >200 |
| Proteus vulgaris | >200 | >200 |

Table III-Continued

| Bacterial organisms tested | Minimum bacteriostatic concentrations $\mu g/cc.$ | |
|---|---|---|
| | 23,671 RP | 23,672 RP |
| Klebsiella pneumoniae - ATTC 10,031 | >200 | >200 |
| Pseudomonas aeruginosa (Bass strain - Institut Pasteur) | >200 | >200 |
| Brucella bronchiseptica (CN 387 - Wellcome Institute) | >200 | >200 |
| Pasteurella multocida (A 125 - Institut Pasteur) | >200 | >200 |
| Mycoplasma gallisepticum | >30 | >30 |

These various determinations show that the activity of the antibiotics 23,671 RP and 23,672 RP is essentially exerted against microorganisms which accept the Gram stain. Furthermore, it can be seen from the results of the determinations that 23,671 RP and 23,672 RP in vitro show a cross-resistance with carbomycin, erythromycin and pyostacin, but not with spiramycin.

B. Anti-Tubercular Acitivty in Vitro

The activities of 23,671 RP and 23,672 RP against Mycobacterium tuberculosis H 37 Rv were determined in a Dubos liquid medium by the technique of successive dilutions. The results of these determinations are given in Table IV.

Table IV

| Antibiotic | Inhibitory concentration with regard to H 37 Rv $\mu g/cc.$ (*) |
|---|---|
| 23,671 RP | 0.6  (1.25) |
| 23,672 RP | 1.25  (5 ) |

(*) The first number indicates the concentration at which the main inhibition of the culture is achieved; the second number (in parentheses) indicates the concentration at which total inhibition is achieved.

23,671 RP is twice as active as 23,672 RP.

The in vitro activity of 23,671 RP was measured in relation to mycobacteria resistant to various antibiotics, so as to demonstrate any cross-resistance. Despite very slight activity differences from one strain to another, 23,671 RP retains its activity against strains which are highly resistant to rifampicin, streptomycin, neomycin and kanamycin, and against strains which are moderately resistant to viomycin and griselimycin.

Toxicity 23,671 RP is moderately toxic and 23,672 RP is practically atoxic, as is shown by the results below in which $LD_{50}$ is the 50% lethal dose. The acute toxicity was determined in mice using oral administration and subcutaneous administration.

23,671 RP: $LD_{50}$ = 750 mg/kg animal body weight administered subcutaneously
= 585 mg/kg animal body weight administered orally 23,672 RP: $LD_{50}$ = atoxic at 2,500 mg/kg animal body weight administered subcutaneously
= atoxic at 2,500 mg/kg animal body weight administered orally.

D. Anti-Microbial Activity in Vivo

The activity of the two antibiotics against experimental (intraperitoneal) infection of mice with staphylococci was determined orally and subcutaneously.

The curative dose ($CD_{50}$), i.e. the dose which cures 50% of the infected mice, in the treatment of the staphylococcal infection are shown in Table V in mg/kg animal body weight.

Table V

| 23,671 RP | | 23,672 RP | |
|---|---|---|---|
| Administered orally | Administered subcutaneously | Administered orally | Administered subcutaneously |
| 40 | 25 | 85 | 35 |

E. Anti-Tubercular Activity in Vivo

The activities in vivo of 23,671 RP and 23,672 RP were determined in mice infected with a virulent human strain of Mycobacterium tuberculosis.

At doses of between 100 and 200 mg/kg animal body weight administered subcutaneously and between 100 and 250 mg/kg animal body weight administered orally, the antibiotics 23,671 RP and 23,672 RP significantly prolong the life of the treated animals as compared to the life of the reference animals.

The organism which produces antibiotics 23,671 RP and 23,672 RP is a strain of *Streptomyces* which was isolated from a sample of soil taken in India: to the organism has been given the number DS 12,370. This microorganism exhibits characteristics which preclude it from being identified with any previously described species, it must therefore be considered a new species and has been given the name *Streptomyces chryseus*.

*Streptomyces chryseus*, strain DS 12,370 forms cylindrical spores measuring 0.3 to 0.4 $\mu$/0.8 to 1.4 $\mu$. The sporiferous filaments are straight or slightly flexuous and are most frequently inserted singly on the filaments which carry them; they are sometimes relatively short but can be of greater length and can carry up to several tens of spores. By its mode of sporulation, this strain is to be classified under the Rectus-Flexibilis section of the Pridham classification.

*Streptomyces chryseus*, Strain DS 12,370 develops well at 25°C, fairly well at 37°C, less well at 45°C and not at all at 50°C. It does not produce a melanin pigment on organic media. The colour of its vegetative mycelium is a persistent yellow, generally in shades of light chrome yellow to deep chrome yellow. It forms a usually rather sparse white aerial mycelium; this aerial mycelium remains white when sporulation occurs, which only takes place slowly and with difficulty on the media on which it appears.

The cultural characteristics and the biochemical properties of *Streptomyces chryseus*, strain DS 12,370 are given in Table VI which follows. Unless otherwise indicated, they are those of cultures which have reached a good state of development, that is to say, of 3 weeks to 1 month at 25°C. These characteristics were observed on nutrient agars and broths usually employed for determining the morphological characteristics of the strains fo Streptomyces, the cultures on agar media being carried out on agar slopes. A certain number of the culture media employed were prepared in accordance with the formulations indicated in "The Actinomycetes", S. A. Waksman, p. 193–197, Chronica Botanica Company, Waltham, Massachusetts, U.S.A., 1950; in this case they are indicated by the letter W followed by the number given to them in "The Actinomycetes". The references or compositions of the other culture media are as follows:

Ref. A — "Hickey and Tresner's Agar" — T. G. Pridham et coll. — Antibiotics Annual, 1956–1957, p. 950

Ref. B — K. L. Jones — Journal of Bacteriology — 57, 142, 1949

Ref. C — Formula W-23 with the addition of 2% of agar

Ref. D — "Yeast Extract Agar" — T. G. Pridham et coll. — Antibiotics Annual, 1956–1957, p. 950

Ref. E — "Tomato Paste Oatmeal Agar" — T. G. Pridham et coll. — Antibiotics Annual, 1956–1957, p. 950

Ref. F — "Melanin formation medium" — The Actinomycetes, vol. 2, p. 333, No. 42 S. A. Waksman — The Williams and Wilkins Company, Baltimore, 1961

Ref. G — W. E. Grundy et coll. — Antibiotics and Chem. 2, 401 1952

Ref. H — "Inorganic Salts — Starch Agar " — T. G. Pridham et coll. — Antibiotics Annual, 1956–1957, p. 951

Ref. I — Corresponds to formula W-1, with 3% of sucrose replaced by 1.5% of glucose Ref. J — Corresponds to formula W-1, with 3% of sucrose replaced by 1.5% of glycerine Ref. K — Corresponds to formula W-18, with 3% of sucrose replaced by 1.5% of glucose Ref. L — Corresponds to formula W-18, with the sucrose omitted and replaced by small strips of filter paper partially immersed in the liquid Ref. M — "Manual of Methods for Pure Culture Study of Bacteria" of the Society of Amercian Bacteriologists, Geneva, N.Y., II$_{50}$ — 18.

Ref. N — "Plain Gelatin" — prepared in accordance with the instructions in the "Manual of Methods for Pure Culture Study of Bacteria" of the Scoiety of American Bacteriologists, Geneva, N.Y. II$_{50}$ - 18

Ref. P — Commercially available skimmed milk powder, reconstituted in accordance with the manufacturer's instructions.

Ref. Q — Medium indicated for the investigation of the production of $H_2S$ by H. D. Tresner and F. Danga — Journal of Bacteriology, 76, 239–244, 1958.

TABLE VI

| Culture medium | Degree of development | Vegetative mycelium (V.m.) or underside of the culture | Aerial structure (comprising the combination of the aerial mycelium and of the sporulation) | Soluble pigment | Observations and biochemical properties |
|---|---|---|---|---|---|
| Hickey and Tresner agar (Ref. A) | Good | V.m. thick and wrinkled, deep chrome yellow | White Very poorly developed | Nil | |
| Bennett agar (Ref. F) | Good | V.m. thick and wrinkled, deep chrome yellow | White Very slight traces. | Very weak Brownish yellow | |
| Emerson agar (Ref. C) | Good | V.m. thick and wrinkled, deep chrome yellow | White Very slight traces. | Nil | |
| Pridham yeast extract agar | Good | V.m. thick and wrinkled, deep chrome yellow | Nil | Nil | |

TABLE VI—Continued

| Culture medium | Degree of development | Vegetative mycelium (V.m.) or underside of the culture | Aerial structure (comprising the combination of the aerial mycelium and of the sporulation) | Soluble pigment | Observations and biochemical properties |
|---|---|---|---|---|---|
| (Ref. D) Pridham oatmeal and tomato agar (Ref. E) | Good | V.m. thick and wrinkled, light brown-yellow | White Very poorly developed. | Nil | |
| Glucose-peptone agar (W-6) | Good | Underside brown-yellow | White. Fairly well developed. | Very weak yellow-brown | |
| Nutrient agar (W-5) | Moderate | V.m. light yellow-brown | Nil | Nil | |
| Tyrosine-yeast extract agar for melanin formation (Ref. F) | Fairly good | Underside light yellow | White. Moderately developed. | Nil | Formation of melanin: negative (observations made in accordance with the recommendations of the author) |
| Krainsky calcium malate agar (Ref. G) | Very moderate | Underside light brown-yellow | White. Poorly developed. | Nil | Solubilisation of the malate: positive, fairly good. |
| Ovalbumin agar (W-12) | Very poor | V.m. weak yellowish. Very poorly developed. | Nil | Nil | |
| Glucose-asparagine agar (W-2) | Medium | V.m. light chrome yellow. | Nil | Weak brownish yellow | |
| Glycerine-asparagine agar (W-3) | Fairly good | V.m. deep chrome yellow. | White. In traces. | Weak brownish yellow | |
| Pridham starch agar (Ref. H) | Good | V.m. thick and wrinkled, deep chrome yellow. | White. Very poorly developed. | Nil | Cylindrical spores measuring 0.3 to $0.4\mu/0.8$ to $1.4\mu$. Straight or flexuous spore ferous filaments. Hydrolysis of starch: positive. |
| Starch-nitrate agar (W-10) | Good | V.m. thick and wrinkled, light brown-yellow. Underside deep chrome yellow. | White. In traces. | Nil | Hydrolysis of starch: positive. |
| Czapek synthetic agar with sucrose (W-1) | Good | V.m. thick and wrinkled, light chrome yellow. Underside deep chrome yellow. | White. Very poorly developed. | Weak yellow-brown | |
| Czapek synthetic agar with glucose (Ref. I) | Fairly good | Underside light chrome yellow. | White. Very poorly developed. | Weak yellow-brown | |
| Czapek synthetic agar with glycerine (Ref. J) | Good | Underside deep chrome yellow. | White. Very moderately developed. | Weak brown-yellow | Cylindrical spores measuring 0.3 to $0.4\mu/0.8$ to $1.4\mu$. Straight or flexuous sporiferous filaments. |
| Starch-nitrate broth (W-19) | Fairly good | Thick velum. Underside yellow. | White. Very moderately developed. | Nil | Production of nitrites from nitrates: strongly positive. |
| Czapek broth with sucrose (W-18) | Medium | Whitish velum. | White. Moderately developed. | Nil | Production of nitrites from nitrates: strongly positive. |
| Czapek broth with glucose (Ref. K) | Medium | Whitish velum. | White. Very moderately developed. | Nil | Production of nitrites from nitrates: strongly positive. |
| Czapek broth with cellulose (Ref. L) | Nil | | | | No utilisation of the cellulose. |
| Nutrient broth with nitrate (Ref. M) | Fairly good | Velum fairly well developed. Underside yellowish. | White. Moderately developed. | Nil | Production of nitrites from nitrates: strongly positive. |
| Culture on potato (W-27) | Very good | V.m. very thick and very wrinkled, chrome yellow. | White. In traces. | Weak brownish | |
| 12% strength pure gelatin (Ref. N) | Good | Thick central colony. Underside light yellow. | White. Average development. | Nil | Good liquefaction of the gelatin. |
| Skimmed milk a) at 25°C (Ref. P) | Good | Light yellowish ring. | | | Peptonisation followed by coagulation. Little variation of the pH. |
| Skimmed milk b) at 37°C | Moderate | Poorly developed yellow ring. | | | Coagulation followed by peptonisation. Very slight acidification of the pH. |
| Tresner and Danga agar (Ref. Q) | Good | V.m. yellow. | White. Poorly developed. | Very weak brownish | Production of $H_2S$: negative (observations made in accordance with the recommendations of the author). |

Streptomyces chryseus, strain DS 12,370 shows a combination of characteristics which do not coincide exactly with any of those of the strains of Streptomyces previously described.

Amongst the species of which a description is given in "Bergey's Manual of Determinative Bacteriology" (7th edition, The Williams and Wilkins Company, Baltimore, 1961) as well as in "The Actinomycetes" (Volumne 2, S. A. Waksman, The Williams and Wilkins Company, Baltimore, 1961), the species to which it would come closest in respect of its characteristics is, in either of these works, Streptomyces achromogenes.

In fact, like S. chryseus, strain DS 12,370, S. achromogenes produces a brown soluble pigment essentially on synthetic media and does not produce it, or only produces it very slightly, on the majority of organic media; it forms straight or flexuous non-coiled sporophores and its spores are cylindrical.

However, S. achromogenes shows a vegetative mycelium of colourless to brownish or yellowish brown shade depending on the media, even ranging to reddish brown on "egg media" and these colourations are not comparable with the marked chrome yellow which colours the vegetative mycelium of Streptomyces chryseus, strain DS 12,370 on all media, including both synthetic and organic media, on which it has been cultured. Furthermore, S. achromogenes, contrary to S. chryseus, strain DS 12,370, forms and aerial mycelium which attains a deep greyish shade on "glycerol nitrate agar", produces a reddish-brown soluble pigment on potato and a light brown soluble pigment on geletin and only liquefies the latter very slightly. It is for these reasons that these two strains, though they resemble one another in certain points, cannot be considered similar.

The ability of S. chryseus, strain DS 12,370 to utilise various sources of carbon and nitrogen to ensure its development was determined in accordance with the principle of the method of Pridham and Gottlieb (J. of Bact. 56, 107–114, 1948). The degree of development was observed on the base medium indicated by the authors, either replacing the glucose by the various sources of carbon respectively tested or $(NH_4)_2SO_4$ by the various sources of nitrogen respectively tested, after a suitable incubation time at 25°C. The results are given in TAble VII.

Table VII

| Sources of carbon tested | Utilisation | Sources of nitrogen tested | Utilisation |
|---|---|---|---|
| D-Ribose | positive | NaNO$_3$ | positive |
| D-Xylose | positive | NaNO$_2$ | positive |
| L-Arabinose | negative | (NH$_4$)$_2$SO$_4$ | positive |
| L-Rhamnose | positive | (NH$_4$)$_2$HPO$_4$ | positive |
| D-Glucose | positive | Adenosine | positive |
| D-Galactose | positive | Uracil | negative |
| D-Fructose | positive | Urea | positive |
| D-Mannose | positive | L-Asparagine | positive |
| L-Sorbose | negative | Glycine | positive, delayed |
| Lactose | positive, delayed | Sarcosine | negative |
| Maltose | positive | DL-Alanine | positive |
| Sucrose | positive | DL-Valine | positive |
| Trelalose | positive | DL-Aspartic acid | positive |
| Cellobiose | positive | L-Glutamic acid | positive |
| Raffinose | negative | L-Arginine | positive |
| Dextrin | positive | L-Lysine | negative |
| Inulin | negative | DL-Serine | positive |
| Starch | positive | DL-Threonine | positive |
| Glycogen | positive | DL-Methionine | positive, delayed |
| Glycerol | positive | Taurine | negative |
| Erythritol | negative | L-Tyrosine | positive |
| Adonitol | positive | DL-Proline | positive |
| Dulcitol | negative | L-Hydroxyproline | negative |
| D-Mannitol | positive | L-Histidine | positive |
| D-sorbitol | positive | L-Tryptophan | positive |
| Inositol | positive | Betaine | negative |

According to a feature of the invention, the antibiotics 23,671 RP and 23,672 RP are produced by aerobically cultivating Streptomyces chryseus, strain DS 12,370 (NRRL 3892), or a mutant thereof capable of producing the antibiotics, using an aqueous nutrient medium containing assimilable sources of carbon, nitrogen and inorganic substances and isolating the antibiotics 23,671 RP and 23,672 RP formed during the culture.

The culture of Streptomyces chryseus, strain DS 12,370 can be carried out by any of the known aerobic surface or submerged culture methods, the latter being preferred because they are more convenient. Conventional types of apparatus currently employed in the fermentation industry may be employed. In particular, the following sequence of operations may be adopted:

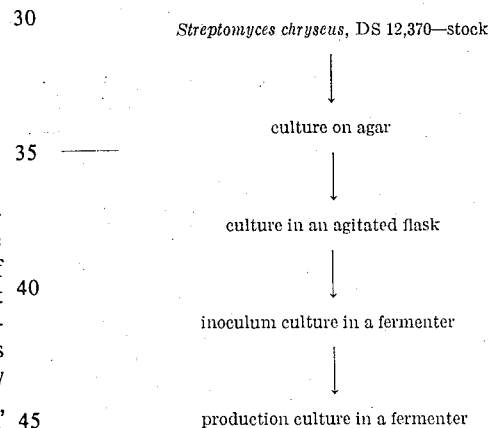

The fermentation medium must contain an assimilable source of carbon and an assimilable source of nitrogen, and inorganic substances and, optionally, growth-promoting factors, all these ingredients may be supplied as well-defined products or complex mixtures such as those found in biological products of various origins.

As sources of assimilable carbon there may be used carbohydrates such as glucose, maltose, dextrins, starch or other carbon-, hydrogen- and oxygen-containing substances such as sugar alcohols, e.g. glycerol or mannitol, or certain organic acids. Certain animal or vegetable oils such as lard oil or soya bean oil may be advantageously used instead of, or in admixture with, the aforementioned carbon-, hydrogen- and oxygen-containing substances.

The suitable sources of assimilable nitrogen are extremely varied. They may be very simple chemical compounds such as inorganic or organic ammonium salts, urea or certain amino acids. They may also be complex substances containing principally nitrogen in a protein form, e.g. casein, lactalbumin, gluten and their hydrolysates, soya bean flour, peanut meal, fish meal, meat extract, yeast extract, distillers' solubles or corn-steep liquor.

Amongst the inorganic substances, some may have a buffering or neutralising effect such as the alkali metal or alkaline earth metal phosphates, or the carbonates of calcium or magnesium. Others contribute to the ionic equilibrium needed for the development of *Streptomyces chryseus*, strain DS 12,370 and for the production of 23,671 RP and 23,672 RP; examples of these are the chlorides and sulphates of the alkali metals and alkaline earth metals. Some of them act more especially as activators of the metabolism of *Streptomyces chryseus*, for example the salts of zinc, cobalt, iron, copper and manganese.

The pH of the fermentation medium at the start of the culture should be between 6.0 and 7.8 and preferably between 6.5 and 7.5 The optimum fermentation temperature is 25°–30°C, but satisfactory production is achieved at temperatures between 23° and 33°C. The rate of aeration of the fermentation broth can vary within quite wide limits, but it has been found that aeration rates of 0.3 to 3 litres of air per litre of broth per minute are particularly suitable. The maximum yield of the antibiotics 23,671 RP and 23,672 RP is obtained after 2 to 8 days' culture, but this period depends predominantely on the medium used.

23,671 RP and 23,672 RP can be isolated from the fermentation broths as follows:

The mixture of the two antibiotics is directly extracted from the fermentation broths by water-immiscible solvents, such as aliphatic alcohols having at least 4 carbon atoms (e.g. butanol), esters (e.g. ethyl acetate), chlorinated hydrocarbons (e.g. dichloroethane, methylene chloride or chloroform), and ketones (e.g. methyl isobutyl ketone). It is advantageous to carry out this operation at pH 7 or at a slightly alkaline pH.

After filtration of the broths and decantation of the antibiotic solution, the crude mixture can be isolated from the above-mentioned organic solutions by concentration of the solution under reduced pressure, followed by precipitation of the antibiotics with a nonsolvent or a poor solvent for them, such as hexane.

The antibiotics 23,671 RP and 23,672 RP can be isolated from the organic extracts of the fermentation broths, after concentration of these extracts if required, by applying appropriate chromatographic techniques. A convenient procedure consists of fractionating the mixture resulting from the extraction of the broth by passing it over a Florisil column (magnesium silicate) eluted by a solvent gradient with a system based on chlorinated solvents. This first fractionation, guided by chromatographic analysis of the eluate on a thin layer of Kieselgel (silica gel), yields two fractions: fraction A, enriched in 23,671 RP and still containing some 23,672 RP, and fraction B with a high proportion of 23,672 RP and still containing some 23,671 RP.

The fraction A is in turn fractionated by chromatography on a silica gel column or alumina column eluted with a system of solvents of increasing polarities. A suitable system is represented by a mixture of hexane and ethyl acetate progressively richer in ethyl acetate, or a series of pure mixed chlorinated solvents or chlorinated solvents with the addition of a lower alcohol, e.g. methanol. The fractions containing 23,671 RP are detected by chromatographic analysis on a thin layer of Kieselgel. 23,671 RP is finally purified by recrystallisation from a diethyl ether-hexane mixture followed by washing the crystals with diisopropyl ether.

Fraction B is also fractionated in order to isolate 23,672 RP by again passing it over a Florisil column eluted with a series of solvents of increasing polarities, based on chlorinated solvents and ethyl acetate. The fractional elution is followed by chromatographic analysis on a thin layer of Kieselgel and the isolated 23,672 RP is purified by recrystallisation from a diethyl ether-hexane mixture followed by recrystallisation from carbon tetrachloride.

The following Examples illustrate the invention.

In the following, the activity is always determined by means of the microbiological diffusion method, using *Staphylococcus aureus* 209 P (ATCC 6,538 P) as the sensitive microorganism, by comparison with a semi-purified sample of 23,671 RP taken as the determination standard and containing 640 $\mu$g/mg.

This activity is expressed in $\mu$g/mg in the case of the solids. The activity of 23,672 RP is also expressed in $\mu$g/mg; in so doing, account is also taken of the fact that in the diffusion method, 23,671 RP is 4 times more active than 23,672 RP against *Staphyloccus aureus* 209 P.

EXAMPLE 1

A 170-litre fermenter is charged with

| | |
|---|---|
| peptone | 600 g. |
| meat extract | 600 g. |
| Cerelose | 1200 g. |
| sodium chloride | 600 g. |
| agar | 240 g. |
| tap water, sufficient to make up to | 110 litres. |

The pH is adjusted to 7.50 with 10N sodium hydroxide solution (140 cc.). The medium is sterilised by bubbling steam at 122°C through it for 40 minutes. After cooling, the volume of the broth is 120 litres and the pH is 6.90. The broth is inoculated with a culture (200 cc.) of *Streptomyces chryseus*, DS 12, 370 (NRRL 3,892) in a shaken Erlenmeyer flask. The culture is developed at 30°C for 26 hours with agitation and aeration with sterile air; it is then suitable for inoculation of the production culture.

The production culture is csrried out in a 800-litre fermenter charged with the following substances:

| | |
|---|---|
| distillers' Solubles | 2 kg. |
| princesse beans | 16 kg. |
| glycerine | 4 kg. |
| sodium chloride | 2 kg. |
| tap water, sufficient to make up to | 360 litres. |

The pH is adjusted to 8.25 with 10N sodium hydroxide solution (400 cc.). The medium is sterilised by bubbling steam at 122°C through it for 40 minutes. After cooling, a sterile aqueous solution (10 litres) containing Cerelose (4 kg.) is added to the broth.

The total volume of the broth is then 400 litres and the pH is 6.90. The broth is inoculated with the inoculum culture (40 litres) from the 170-litre fermenter described above. The production culture is carried out at 28°C for 97 hours with agitation using a motor rotating at 260 revolutions per minute and aeration with a volume of sterile air of 35 m³/hour. The pH of the medium is then 7.55 and the volume of the broth is 370 litres.

The amount of antibiotic present is 110 µg/cc.

EXAMPLE 2

Fermentation broth (10 litres) obtained as described in Example 1, and of strength 85 µg/cc., is introduced into a vat equipped with a stirrer. A filtration aid (900 g.) is added and the mixture at pH 7.5 is stirred for quarter of an hour. The mixture is then filtered on a filter equipped with a layer of filtration aid (2 kg.). The filtrate (10 litres) is collected. This filtrate is extracted with butanol (4 litres followed by 3 litres), the mixture being adjusted to pH 7 with a 6N hydrochloric acid solution.

The butanol extract is concentrated to a volume of 100 cc. at 30°C under reduced pressure (20 mm Hg). On addition of hexane (1 litre) to the residue, a crude mixture of 23,671 RP and 23,672 RP precipitates which, after washing filtering and drying, weighs 2.1 g and is in the form of a brown amorphous powder of strength 36 µg/mg.

EXAMPLE 3

Fermentation broth (380 litres) obtained as described in Example 1, and of strength 110 µg/cc., is introduced into a vat equipped with a stirrer and the pH is adjusted to 8 by addition of a dilute sodium hydroxide solution. Stirring is maintained for half an hour and a filtration aid (30 kg.) is then added. The mixture is filtered on a filter press and the filter cake is washed with water (100 litres) which has been rendered alkaline to pH 8 by means of 6N sodium hydroxide.

The filtrate, the volume of which is 380 litres, is adjusted to pH 7 by means of a 6N hydrochloric acid solution, stirred for 10 minutes and then extracted in counter-current with methylene chloride (230 litres), using a two-stage centrifuge.

The methylene chloride extract is concentrated under reduced pressure (20 mm Hg) and at 30°C to a volume of 1 litre. The methylene chloride concentrate is then passed over a column (diameter: 7.5 cm; height: 65 cm) of Florisil (1.5 kg.). The concentrate passes downwards through the Florisil bed in 3 hours. The column is then washed, always downwards, with methylene chloride (15 litres) at the rate of 1.5 litres per hour. The various effluents are discarded and the column is then eluted by solvent gradient, gradually adding a mixture (20 litres) of methylene chloride-methanol (95/5 by volume) to methylene chloride (5 litres). The rate of elution is 1.5 litres per hour.

The eluate is fractionated every 500 cc.; 44 fractions are thus obtained. Each fraction is analysed by thin layer chromatography by placing the solution (20 µl) on a thin layer of Merck F 254 silica gel in a cell saturated with a chloroform-methanol (87/13 by volume) solvent mixture at 22°C.; the migrations are revealed by spraying with concentrated sulphuric acid. The Rf values are as follows:

23,671 RP Rf = 0.55
23,672 RP Rf = 0.45

In accordance with the results of this analysis, the fractions principally containing 23,671 RP and those principally containing 23,672 RP are separately combined and the two solutions thus obtained are then concentrated to dryness at 30°C under reduced pressure (20 mm Hg).

Crude 23,671 RP (30 g.) in the form of a light beige amorphous powder of strength 525 µg/mg, and crude 23,672 RP (7 g.) in the form of a light beige amorphous powder are thus obtained.

EXAMPLE 4

Crude 23,671 RP (36 g.), prepared according to Example 3 and of strength 815 µg/mg, is dissolved in acetone (180 cc.) with stirring. Kieselgel MERCK F 254 (0.05–0.2 mm; 220 g.) is added to the acetone solution and the whole is then dried at 45°C under reduced pressure (20 mm Hg) for 4 hours.

The residue is deposited at the top of a column (diameter: 5 cm; height: 1 m) of Kieselgel MERCK F 254 (0.05–0.2 mm; 2 kg.) set up in hexane. The column is successively washed with hexane (5 litres), a hexane-ethyl acetate mixture (75/25 by volume; 8 litres), a hexane-ethyl acetate mixture (50/50 by volume; 8 litres) and a hexane-ethyl acetate mixture (25/75 by volume; 6 litres). The effluents are discarded.

The column is then eluted with ethyl acetate (12 litres). The eluate is separated into fractions every 100 cc. and the fractions are analysed by thin layer chromatography in accordance with the technique described in Example 3.

The fractions containing 23,671 RP are concentrated to dryness at 30°C under reduced pressure (20 mm Hg).

The antibiotic 23,671 RP (20 g.) is thus obtained in the form of a yellowish amorphous powder substantially of strength 1000 µg/mg.

EXAMPLE 5

Crude 23,671 RP (16.5 g.), prepared according to Example 3 and of strength 460 µg/mg is dissolved in methylene chloride (250 cc.) with stirring. Diisopropyl ether (250 cc.) is added to this methylene chloride solution. The mixture obtained is then clarified on a fluted filter and thereafter passed over a column (diameter: 4 cm; height: 33 cm) of alumina (400 g.) acidified to pH 4.

The column is developed by successively passing the following through it, in sequence:

1. a methylene chloride-diisopropyl ether mixture (1/1 by volume; 1 litre),
2. pure methylene chloride (1 litre),
3. a methylene chloride-chloroform mixture (1/1 by volume; 1 litre)
4. pure chloroform (1 litre), and
5. a chloroform-methanol mixture (9/1 by volume; 1 litre).

Five fractions $F_1$-$F_2$-$F_3$-$F_4$-$F_5$ are thus obtained, which are studied by thin layer chromatography in accordance with the technique described in Example 3.

Fraction $F_1$ is of no interest and is discarded.

Fractions $F_2$ and $F_3$ are combined and concentrated to dryness at 30°C under reduced pressure (20 mm Hg). Antibiotic 23,671 RP (8.3 g.) is thus obtained in the form of a whitish amorphous powder of strength 1,000 µg/mg.

Fractions $F_4$ and $F_5$ are combined and then concentrated to dryness under the same conditions. Antibiotic 23,672 RP (7.2 g.) is thus obtained in the form of a whitish amorphous powder of strength 860 µg/mg.

EXAMPLE 6

Antibiotic 23,671 RP (20 g.), prepared according to Example 5, is dissolved in diethyl ether (400 cc.) with stirring. The solution obtained is clarified by filtration on a fluted filter. Hexane (1,600 cc.) is added slowly to the filtrate with stirring and the resulting mixture left for 2 hours at 4°C. The deposited crystals are filtered off, washed and dried. Antibiotic 23,671 RP (18 g.) is thus obtained in the form of a white crystalline powder.

EXAMPLE 7

Crystalline antibiotic 23,671 RP (25 g.), prepared according to Example 6, is suspended in diisopropyl ether (515 cc.) by vigorous stirring for 2 hours. The suspension is then filtered through a sintered glass filter. The product obtained is washed and dried at 50°C under reduced pressure (5 mm Hg) for 24 hours.

Antibiotic 23,671 RP (20.2 g.) is thus obtained in the form of a white crystalline powder of strength 1,000 µg/mg.

EXAMPLE 8

Crude 23,672 RP (13 g.), prepared in identical manner to that described in Example 3, is dissolved in acetone (1,300 cc.). The acetone solution is decolourised by addition of charcoal 2S (7.1 g.). The decolourised acetone solution is concentrated to dryness at 30°C under reduced pressure (20 mm Hg).

The residue is redissolved in benzene (50 cc.) and the solution poured onto the top of a column (diameter: 1.5 cm; height: 55 cm) of Florisil (500 g.).

The column is successively washed with benzene (2 litres), methylene chloride (3 litres), a methylene chloride-ethyl acetate mixture (95/5 by volume; 2 litres), a methylene chloride-ethyl acetate mixture (90/10 by volume; 2 litres), a methylene chloride-ethyl acetate mixture (80/20 by volume; 2 litres) a methylene chloride-ethyl acetate mixture (50/50 by volume; 5 litres), and ethyl acetate (2 litres).

Several fractions are thus obtained, which are analysed by thin layer chromatography in accordance with the technique described in Example 3, The fractions rich in 23,672 RP are combined and concentrated to dryness at 30°C under reduced pressure (20 mm Hg). Semi-purified 23,672 RP (4 g.) is thus obtained in the form of a whitish amorphous powder.

EXAMPLE 9

23,672 RP (4 g.), prepared according to Example 8, is dissolved in anaesthetic grade diethyl ether (80 cc.). Crystallisation is brought about by the slow addition of hexane (120 cc.). White crystals (2.5 g.) of strength 1,000 µg/mg are thus obtained.

EXAMPLE 10

Crystalline antibiotic 23,672 RP (8 g.), prepared according to Example 9, is suspended in carbon tetrachloride (800 cc.) by vigorous stirring for 2 hours. The suspension obtained is filtered over a sintered glass filter. The crystals are washed with carbon tetrachloride (50 cc.) and then dried at 40°C for 2 hours under reduced pressure (5 mm Hg).

The dry product is again suspended in carbon tetrachloride (150 cc.) and the mixture is heated under reflux for 1 hour. The solution obtained is stirred slowly and cooled for 15 hours at 20°C and then for 24 hours at 0°C. The crystals which form are filtered off, washed and dried for 15 hours at 45°C under reduced pressure (5 mm Hg).

Antibiotic 23,672 RP (4.2 g.) is thus obtained in the form of a white crystalline powder of strength 1,000 µg/mg.

The present invention includes within its scope pharmaceutical compositions comprising at least one of the antibiotics 23,671 RP and 23,672 RP in association with a pharmaceutically acceptable carrier and/or a compound which may itself be physiologically active, for example another antibiotic.

These compositions may be in any of the pharmaceutical forms known to be suitable for the administration of antibiotics and suitable for the method of administration envisaged.

The proportion of the antibiotic(s) in the compositions may be varied according to the desired therapeutic effect.

In human therapy, the antibiotics of the invention are useful, in particular, against staphylococcal infections and tubercular affections. They can be administered orally, rectally or parenterally with oral administration being preferred. The daily doses are from 250 mg to 3 g. for an adult.

Solid compositions for oral administration include tablets, pills, powders or granules. Such compositions can contain from 0.5 to 95% of the antibiotic admixed with at least one inert diluent such as sucrose, lactose or starch. The compositions may also comprise, as is normal practice, additional substances other than the inert diluents, e.g. lubricating agents such as magnesium stearate. Liquid compositions for oral administration include pharmaceutically acceptable emulsions, solutions, suspensions, syrups and elixirs containing inert diluents commonly used in the art, such as water or liquid paraffin. Besides inert diluents such compositions may also comprise adjuvants, such as wetting, emulsifying and suspending agents, and sweetening and flavouring agents. The compositions according to the invention, for oral administration, also include capsules of absorbable material such as gelatin containing the antibiotic with or without the addition of diluents or excipients.

Preparations according to the invention for parenteral administration include sterile suspensions or emulsions, or non-aqueous solutions. Examples of suitable solvents or vehicles are propylene glycol, polyethylene glycol, vegetable oils, in particular olive oil, and injectable organic esters, e.g. ethyl oleate. These compositions may also contain adjuvants, in particular wetting, emulsifying and dispersing agents. They may be sterilised by, for example, filtration through a bacteria-retaining filter, by incorporation in the compositions of sterilising agents, by irradiation or by heating. They may also be manufactured in the form of sterile solid compositions, which can be dissolved or dispersed in sterile water or some other injectable sterile medium immediately before use.

Compositions for rectal administration are suppositories which contain, in addition to the antibiotic, excipients such as cacao butter or a suitable suppository wax.

The following Example illustrates pharmaceutical compositions according to the invention.

EXAMPLE 11

Tablets containing 100 mg of 23,671 RP and having the following composition are prepared in accordance with the usual technique:

| | |
|---|---|
| 23,671 RP | 0.100 g. |
| wheat starch | 0.090 g. |
| colloidal silica | 0.008 g. |
| magnesium stearate | 0.002 g. |

These tablets can be used in human therapy at the rate of 3 to 20 tablets per day for an adult.

We claim:

1. The antibiotic herein designated 23,671 RP which has the following characteristics: it is a white crystalline powder melting at 130°–132°C., which is practically insoluble in water and soluble in alcohols, acetone, diethyl ether, dimethylformamide and chlorinated hydrocarbon solvents; it has the elementary composition C = 58.45–58.6%, H = 8.6–8.7%, O = 31.35–31.55%; its optical rotation is $[\alpha]_D^{24.5} = -71.5° \pm 1.5°$ ($c = 1$, methanol); its ultra-violet spectrum (determined in methanol solution) shows an absorption maximum at 285 nm ($E_{1cm}^{1\%} = 1.04$) and an absorption minimum at 252 nm ($E_{1cm}^{1\%} = 0.67$), and its infra-red spectrum (determined with tablets of a mixture with potassium bromide) shows principal absorption bands as follows: 3,480 strong, 2,980 strong, 2,940 strong, 2,920 shoulder, 2,890 medium, 2,840 weak, 1,735 very strong, 1,710 shoulder, 1,630 medium, 1,455 strong, 1,412 medium, 1,375 strong, 1,350 medium, 1,345 shoulder, 1,330 medium, 1,325 shoulder, 1,295 medium, 1,260 shoulder, 1,235 medium, 1,215 very weak, 1,162 very strong, 1,115 strong, 1,095 shoulder, 1,080 very strong, 1,060 strong, 1,035 shoulder, 1,000 strong, 985 shoulder 965 medium, 920 medium, 905 medium, 870 weak, 835 medium, 805 weak, 780 medium, 745 very weak, 725 very weak, 700 weak, 660 shoulder, 645 shoulder, 600 weak, 500 weak, 455 medium, 420 weak and 395 weak.

2. The antibiotic herein designated 23,672 RP which has the following characteristics: it is a white crystalline powder melting at 153°–155°C., which is practically insoluble in water and soluble in alcohols, acetone, diethyl ether, dimethylformamide and chlorinated hydrocarbon solvents; it has the elementary composition C = 58.6–58.7%, H = 8.4–8.5%, O = 32.6–32.8%; its optical rotation is $[\alpha]_D^{24.5} = -71° \pm 1.5°$ ($c = 1$, methanol); its ultra-violet spectrum (determined in methanol solution) shows an absorption maximum at 285 nm ($E_{1cm}^{1\%} = 0.67$) and an absorption minimum at 254 nm ($E_{1cm}^{1\%} = 0.40$), and its infra-red spectrum (determined with tablets of a mixture with potassium bromide) shows principal absorption bands as follows: 3,450 very strong, 3,210 shoulder, 2,965 strong, 2,921 strong, 2,890 shoulder, 2,870 weak, 2,830 shoulder, 2,040 very weak, 1,740 very strong, 1,625 medium, 1,450 strong, 1,405 medium, 1,375 strong, 1,347 medium, 1,325 medium, 1,255 weak, 1,240 medium, 1,210 weak, 1,185 shoulder, 1,155 very strong, 1,135 weak, 1,108 strong, 1,090 shoulder, 1,075 medium, 1,070 weak, 1,055 very strong, 1,025 shoulder, 995 strong, 975 shoulder, 955 medium, 922 shoulder, 912 medium, 895 weak, 860 weak, 830 medium, 800 weak, 777 medium, 740 very weak, 715 very weak, 692 weak, 655 shoulder, 635 shoulder, 595 medium, 545 medium, 490 medium, 450 medium and 415 shoulder.

3. Process for the production of the antibiotics 23,671 RP and 23,672 RP which comprises cultivating *Streptomyces chryseus*, strain DS 12,370 (NRRL 3,892), in an aqueous nutrient medium containing assimilable sources of carbon, nitrogen and inorganic substances, under submerged aerobic culture conditions commencing at a pH within the range between 6.0 and 7.8 and at a temperature of between 23° and 33°C, until a substantial amount of said antibiotics is formed in the said nutrient medium, and separating the said antibiotics formed during the culture from the nutrient medium.

4. Process according to claim 3 in which the pH of the culture medium at the beginning of the culture is between 6.5 and 7.5.

5. Process according to claim 3 in which the temperature of the culture medium is 25°–30°C.

6. Process according to claim 3 in which the culture medium is aerated at a rate of from 0.3 to 3 litres of air per litre of medium per minute.

7. Process according to claim 3 in which 23,671 RP and 23,672 RP are separated from the culture medium by extracting the antibiotics with a water-immiscible organic solvent for the antibiotics selected from the group consisting of butanol, ethyl acetate, dichloroethane, methylene chloride, chloroform and methyl isobutyl ketone.

8. Process according to claim 7 in which extraction of the antibiotics from the culture medium is effected with the medium at pH 7 to 7.5.

9. Process according to claim 7 in which 23,671 RP and 23,672 RP are isolated from their organic solution by concentrating the solution under sub-atmospheric pressure and precipitating the antibiotics from the concentrate by addition of hexane.

10. Process according to claim 7 in which 23,671 RP and 23,672 RP are isolated separately from the organic solution by chromatography.

11. A pharmaceutical composition which comprises an antibacterially effective amount of at least one of 23,671 RP and 23,672 RP in association with a pharmaceutically acceptable carrier, the said antibiotic(s) being present in an amount of 0.5 to 95 percent by weight of the composition.

* * * * *